(12) United States Patent
Stamps et al.

(10) Patent No.: US 8,444,382 B2
(45) Date of Patent: May 21, 2013

(54) ROTOR HUB FOR USE WITH HIGH-INERTIA BLADES

(75) Inventors: Frank B. Stamps, Colleyville, TX (US); Patrick R. Tisdale, Roanoke, TX (US); Mithat Yuce, Argyle, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 13/391,708

(22) PCT Filed: Jun. 29, 2011

(86) PCT No.: PCT/US2011/042350
§ 371 (c)(1),
(2), (4) Date: Feb. 22, 2012

(87) PCT Pub. No.: WO2013/002784
PCT Pub. Date: Jan. 3, 2013

(65) Prior Publication Data
US 2013/0004311 A1  Jan. 3, 2013

(51) Int. Cl.
*B64C 27/51* (2006.01)
(52) U.S. Cl.
USPC ............ 416/1; 416/106; 416/210 R; 416/500; 416/131; 416/140
(58) Field of Classification Search ............... 416/1, 206, 416/210 R, 500, 131, 140
See application file for complete search history.

(56) References Cited

U.S. PATENT DOCUMENTS

| | | | | |
|---|---|---|---|---|
| 2,853,141 | A * | 9/1958 | Leoni | 416/106 |
| 3,942,910 | A | 3/1976 | Snyder et al. | |
| 4,235,570 | A * | 11/1980 | Ferris et al. | 416/134 A |
| 4,257,739 | A * | 3/1981 | Covington et al. | 416/134 A |
| 4,676,720 | A * | 6/1987 | Niwa et al. | 416/134 A |
| 7,845,909 | B2 | 12/2010 | Stamps et al. | |
| 2008/0247876 | A1 | 10/2008 | Stamps et al. | |
| 2011/0027083 | A1 | 2/2011 | Stamps et al. | |

\* cited by examiner

*Primary Examiner* — Ninh H Nguyen
(74) *Attorney, Agent, or Firm* — James E. Walton; J. Oliver Williams

(57) ABSTRACT

A rotor hub has a yoke with radial arms allowing flapping of connected blades about a flap axis. A grip is rigidly attached to each blade, and a lead-lag bearing connects each grip to one of the arms, the bearing defining a lead-lag axis outboard of the flap axis. Each arm has a pair of straps located on opposite sides of the rotor plane for transferring centrifugal force from the blades to the central portion of the yoke. A pair of lead-lag dampers is provided for each grip, the dampers of each pair being located on opposite sides of the rotor plane and connecting an inboard end portion of the grip to the adjacent strap. In-plane motion of a blade causes rotation of the attached grip about the lead-lag axis, causing opposite motion of an inboard end portion of the grip. The dampers act to oppose rotation of the grip.

16 Claims, 6 Drawing Sheets

ROTOR HUB FOR USE WITH HIGH-INERTIA BLADES

TECHNICAL FIELD

The technical field is rotor hub assemblies for aircraft.

DESCRIPTION OF THE PRIOR ART

Rotary-wing aircraft, such as helicopters and tiltrotors, have at least one rotor for providing lift and propulsion forces. These rotors have at least two airfoil blades connected to a hub, and the hub is mounted on a rotatable mast driven in rotation by an engine or motor.

Many rotors include a lead-lag hinge designed to allow in-plane motion of a blade relative to the central hub about an axis generally normal to the plane of rotation, such that the blade "runs in" ("leads") or "gets behind" ("lags") with respect to other blades. Lead-lag motion may be due to the extra rotational speed caused by the conservation of angular momentum during out-of-plane "flapping" motions of the blades and to differences in aerodynamic drag encountered by the blades at various moments of one rotational cycle. The lead-lag motion may be provided for using various means, including use of discrete lead-lag hinges or use of virtual hinges in a flexible yoke.

To prevent excessive motion about the lead-lag hinge, dampers are normally incorporated in the design of this type of rotor system. The purpose of a damper is to provide a force opposing the in-plane accelerations of the rotor blades and maintain the frequency of the lead/lag motion within a desired range.

FIG. 1 is an oblique view of an example of a prior-art rotor hub that allows for lead-lag motion of the rotor blades. Rotor assembly 11, which is used on the Eurocopter AS355 Twin-Star helicopter, comprises a yoke 13 having three arms 15 extending radially from a central portion of yoke 13. Yoke 13 is mounted to a mast 17, which is driven in rotation by an engine located in aircraft 19. A blade 21 is movably attached to each arm 15 of yoke 13 by an upper strap 23 and a lower strap 25, with the inboard end of each blade 21 being rigidly attached with bolts 27 to the outboard ends of the associated straps 23, 25. A spherical bearing 29 connects the inboard ends of straps 23, 25 for each blade to an inboard portion of an arm 15, each spherical bearing 29 being located in an aperture 31 of arm 15. An outboard shear bearing 33 connects each arm 15 to an inner portion of a lead-lag damper 35, with an outer portion of damper 35 being mounted to straps 23, 25. Bearings 29, 33 cooperate to allow for each assembly of blade 21 and straps 23, 25 to pivot about a pitch axis 37 relative to arm 15, and the design of arms 15 allows for flapping of the blade-straps assembly about a flap axis 39. In addition, spherical bearing 29 allows the blade-straps assembly to pivot about a lead-lag axis 41, with the outer portion of damper 35 moving together with the blade-straps assembly relative to the inner portion of damper 35 and arm 15. The use of spherical bearing 29 means that flap axis 39 and lead-lag axis 41 intersect as coincident axes.

FIG. 2 is a schematic top view of the components of rotor hub 11. As described above for FIG. 1, blade 21 is rigidly attached to straps 23, 25 (upper strap 23 removed in this view), and the assembly of blade 21 and straps 23, 25 pivot relative to arm 15 about lead-lag axis 41. Lead-lag axis 41 is perpendicular to the plane of the view and intersects both flap axis 39 and pitch axis 37, with spherical bearing 29 forming the focus of axes 37, 39, 41. Cylindrical bearing 33 is attached to Inner portion 43 of damper 35, and outer portion 45 of damper 35 is mounted to straps 23, 25. In lead-lag motion of blade 21, outer portion 45 moves with straps 23, 25 relative to inner portion 43, and a damping apparatus in damper 35 acts to oppose this relative motion, and thereby damping lead-lag motion of blade 21.

FIG. 3 is an oblique view of an example of a prior-art rotor hub that allows for lead-lag motion of the rotor blades, and FIG. 4 is a schematic top view of the rotor hub. Rotor assembly 47, which is used on the Boeing AH-64 Apache helicopter, comprises a yoke 49 having four arms 51 (shown in FIG. 4) extending radially from a central portion of yoke 49. Yoke 49 is mounted to a mast 53, which is driven in rotation by an engine located in aircraft 55. A blade 57 is movably attached to each arm 51 of yoke 49 by a cuff 59, with the inboard end of each blade 57 being pivotally attached with bolt 61 to the outboard end of the associated cuff 59. This allows blade 57 to pivot relative to cuff 59 and arm 51 about a lead-lag axis 63 defined by bolt 61. As shown in FIG. 4, a cylindrical shear bearing 65 connects the inboard end of each cuff 59 to an inboard portion of an arm 51, each bearing 65 being located in an aperture 67 of arm 51. An outboard portion of arm 51 acts as a torsion shank 69 (shown in FIG. 4) that connects the outboard end of each arm 51 to an outboard portion of cuff 59. Bearings 63 and torsion shank 69 cooperate to allow for each assembly of blade 57 and cuff 59 to pivot about a pitch axis 71 relative to arm 51 (through twisting deformation of torsion shank 69), and the design of arms 51 allows for flapping of the blade-cuff assembly about a flap axis 73. A lead-lag damper 75 is connected between blade 57 and cuff 59 on the advancing side of each cuff 59, and a lead-lag damper 77 is connected between blade 57 and cuff 59 on the retreating side of cuff 59.

Referring to FIG. 4, as described above for FIG. 3, blade 57 is pivotally attached to cuff 59 (upper portion of cuff 59 removed in this view), and blade 57 pivots relative to cuff 59 about lead-lag axis 63, which is perpendicular to the plane of the view. Lead-lag dampers 75, 77 are located on opposite sides of cuff 59 and oppose lead-lag motion of blade 57 about axis 63. During lead-lag motion of blade 57, dampers 75, 77 are extended or retracted and act to oppose the relative motion of blade 57 and cuff 59, and thereby damping lead-lag motion of blade 57.

Although great strides have been made in the art of rotor hubs for aircraft, significant shortcomings remain.

DESCRIPTION OF THE PREFERRED EMBODIMENT

Rotor hub assemblies for rotary-wing aircraft, as described herein, provide for rotation of blades to provide lift and thrust forces for flight. As described above, rotor hubs having articulated features allow for movement of the blades relative to a central member, such as a yoke, the movement being due to various forces imparted on the blades during operation. One of these motions is lead or lag in-plane motion caused by blade speed changes due to flapping or to varying aerodynamic drag forces. It is desirable to control the amount and frequency of these lead-lag motions.

A high lead-lag frequency, which is in the range of approximately 0.48 to 0.8 per revolution of the rotor, is achieved by locating the lead-lag hinge far outboard of the flap hinge and the center of rotation of the rotor. The flap hinge is defined by the focus of an inboard spherical bearing that reacts centrifugal force and shear loads, and minimizing the flap-hinge offset minimizes moment loads during flapping. The portion of the hub that flaps and feathers with changes of blade pitch is constrained by the outboard cylindrical shear bearing, which is supported and allowed to flap by a composite flexure not loaded with centrifugal force. A cylindrical elastomeric bearing is connected between the centrifugal-force straps and the grip, the bearing allowing the grip to pivot a small amount to exercise a lead-lag damper in the chordwise (in-plane) directions. This design is particularly compatible with blades having a high amount of inertia.

Figure 1:
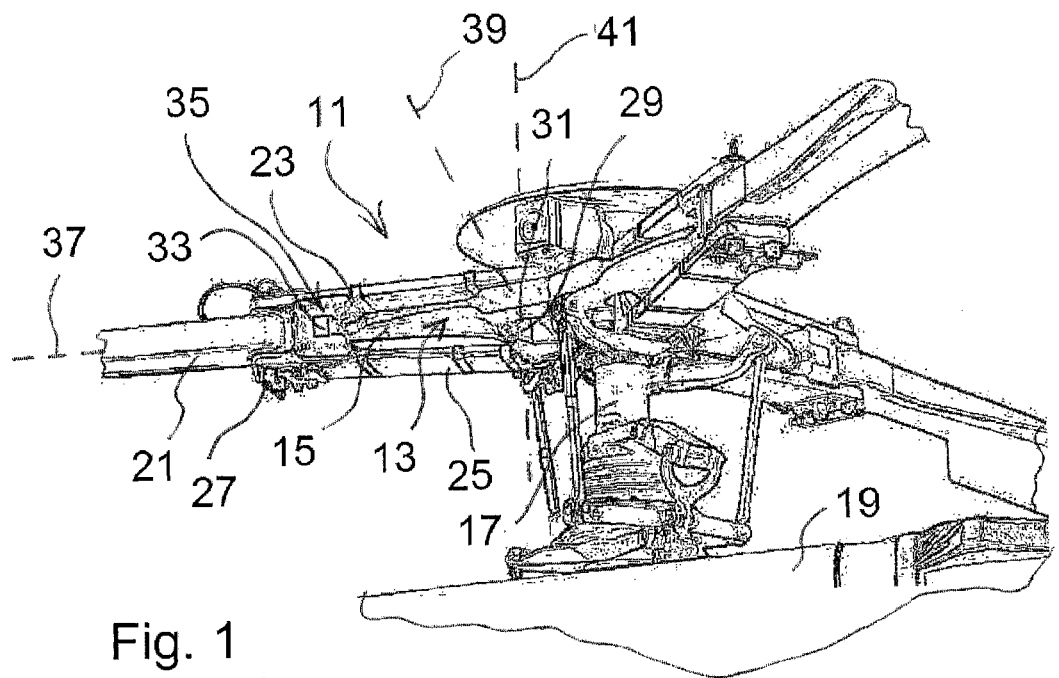
FIG. 1 is an oblique view of a prior-art rotor hub assembly.
Figure 2:
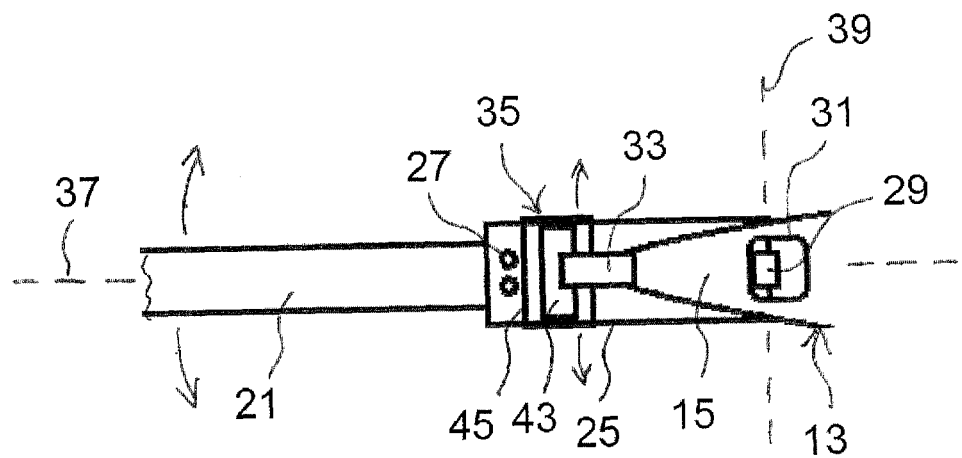
FIG. 2 is a schematic view of the rotor hub assembly of FIG. 1, portions of the assembly having been removed.
Figure 3:
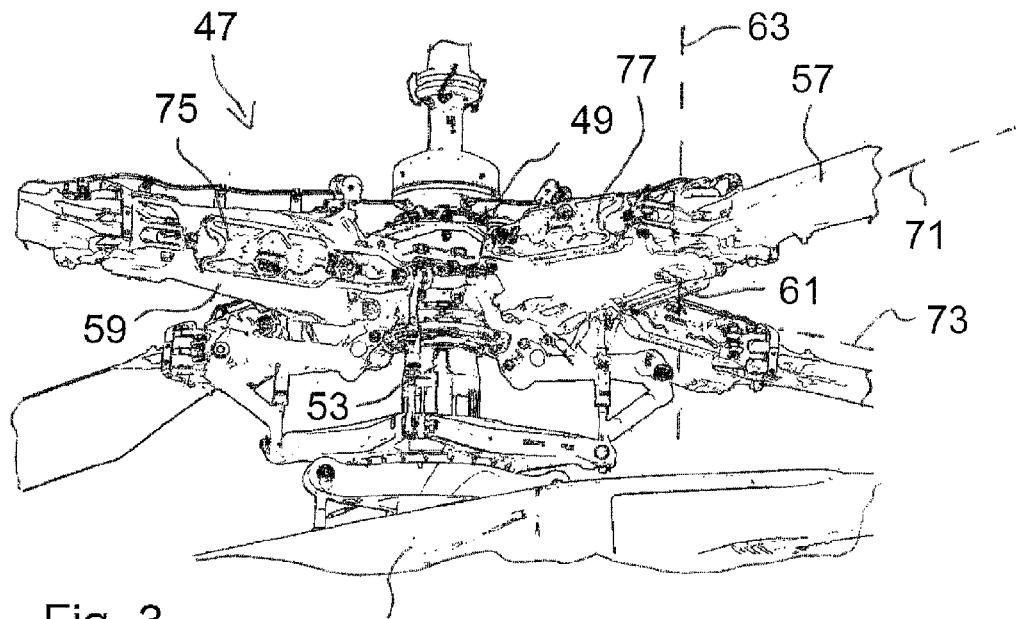
FIG. 3 is an oblique view of a prior-art rotor hub assembly.
Figure 4:
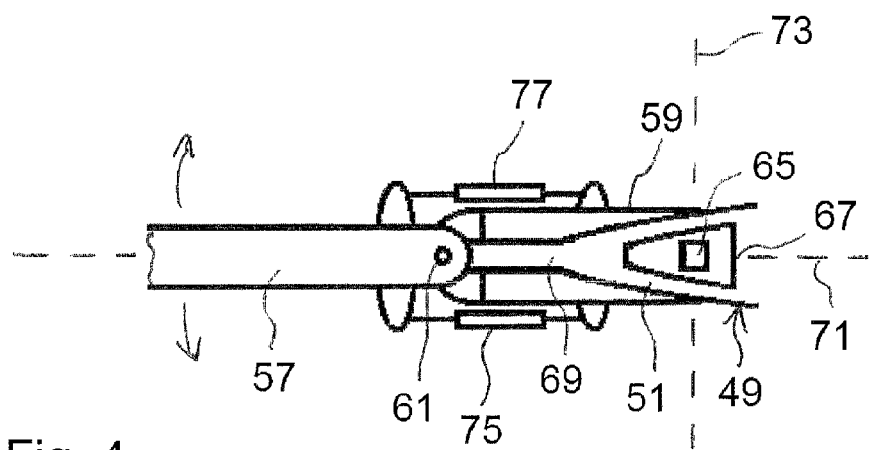
FIG. 4 is a schematic view of the rotor hub assembly of FIG. 3, portions of the assembly having been removed.
Figure 5:
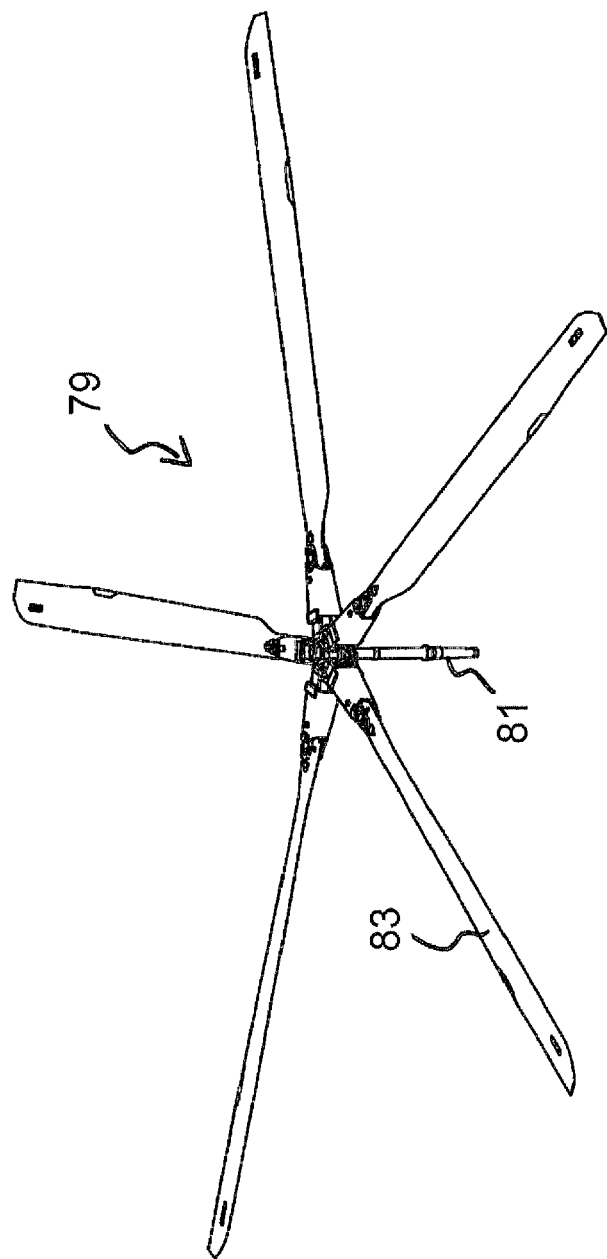
FIG. 5 is an oblique view of a rotor hub assembly.
Figure 6:
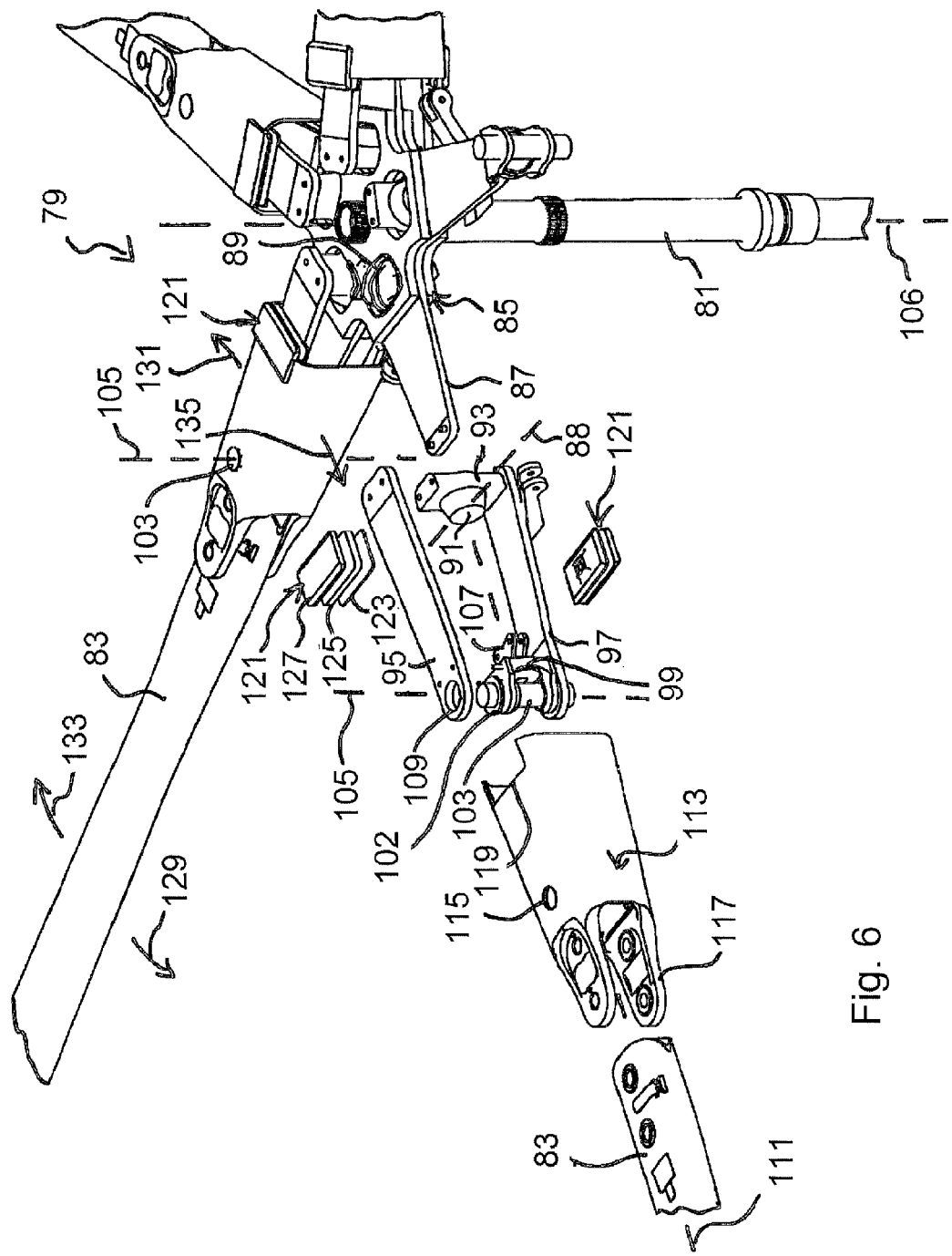
FIG. 6 is an oblique exploded view of the rotor hub assembly of FIG. 5.
Figure 7:
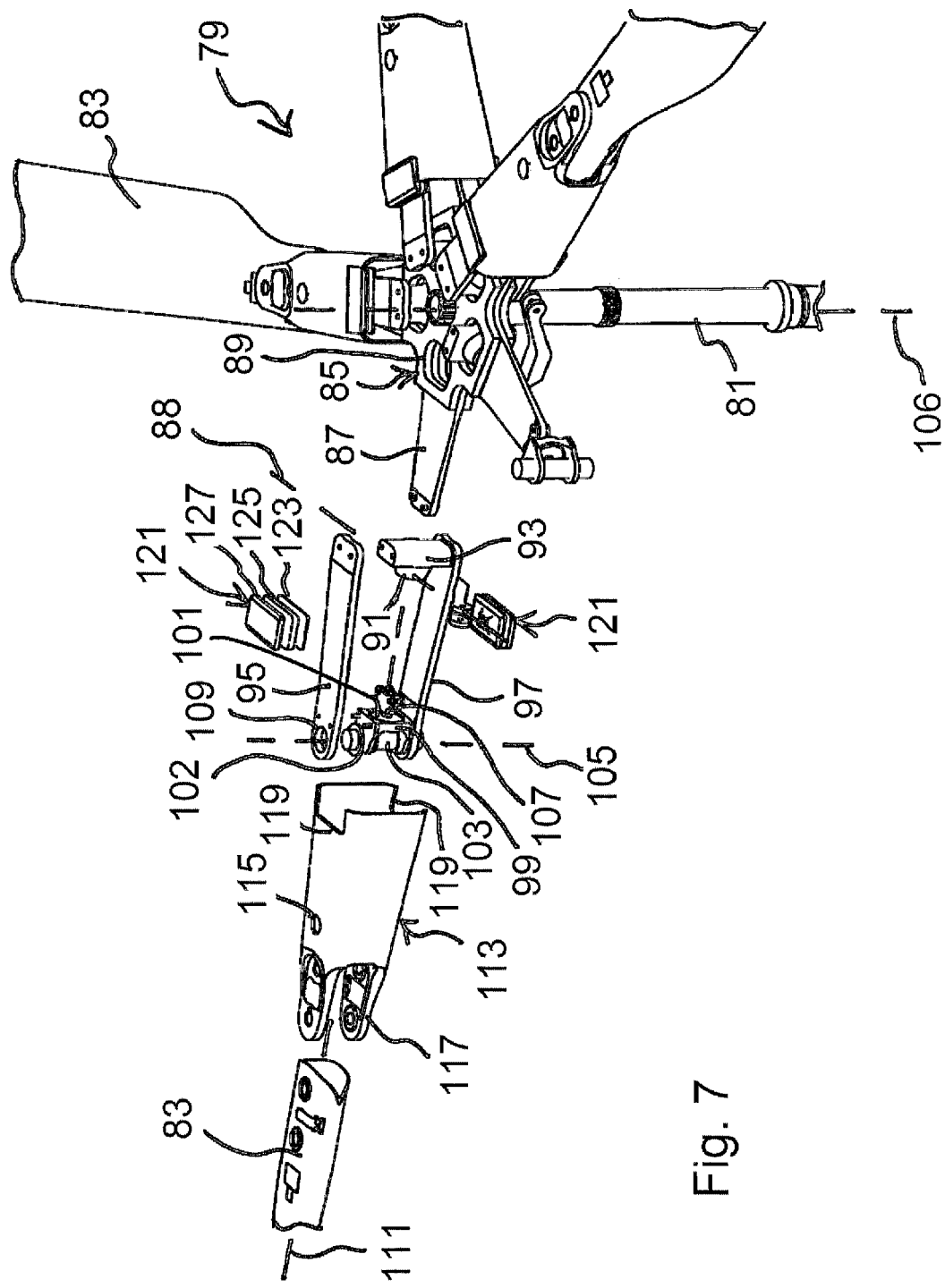
FIG. 7 is an oblique exploded view of the rotor hub assembly of FIG. 5.

FIGS. 5 through 7 show a hub assembly 79 for a rotary-wing aircraft, such as a helicopter. FIG. 5 is an oblique view showing the complete assembly mounted on a mast 81, and FIGS. 6 and 7 are oblique views showing exploded portions of assembly 79. Assembly 79 is shown with five blades 83, though assembly may be constructed to have more or fewer blades 83.

Referring to FIGS. 6 and 7, hub assembly 79 comprises a central yoke 85 having flexure arms 87 extending radially from a central portion of yoke 85. Yoke 85 is rigidly attached to mast 81, and the outboard portions of arms 87 are constructed to allow for out-of-plane deformation during flapping motion of attached blades 83 about a flap axis 88. Each arm 87 has a bearing aperture 89 located at an inboard portion of yoke 85.

To attach blades 83 to yoke 85, a grip and straps assembly is used. A spherical bearing 91 is attached to a bearing support 93, each bearing 91 being used to transfer shear and centrifugal forces into the associated arm 87. An upper strap 95 and a lower strap 97 each connect at an inboard end portion to an end portion of bearing support 93, with bearing support 93 and bearing 91 being located in bearing aperture 89. A bearing housing 99 comprises a compound spherical and cylindrical shear bearing 101 (FIG. 7) and a cylindrical elastomeric lead-lag pivot bearing 102 having a shaft 103 extending through and beyond both ends of bearing 102. Lead-lag bearing 102 and shaft 103 define a lead-lag axis 105, which is located farther outboard of flap hinge 88 relative to axis 106 of mast 81. Therefore, flap axis 88 and lead-lag axis 105 are not coincident and do not intersect.

A clevis 107 extends from shear bearing 101 for rigid attachment to the outboard end of arm 87, and straps 95, 97 have holes 109 sized for receiving shaft 103. When assembled together onto arm 87, bearings 91, 101 cooperate to define a pitch axis 111, and support 93 and housing 99 have lengths that position straps 95, 97 apart from each other a sufficient amount to allow for limited rotation of straps 95, 97, housing 99, and support 93 together about pitch axis 111. The inboard portion of arm 87 cooperates with bearing 91 to define flap axis 88.

A blade grip 113 has holes 115 on opposing surfaces, holes 115 being sized for receiving opposing portions of shaft 103 and allowing for limited pivotal movement of grip 113 relative to straps 95, 97 about lead-lag axis 105. Blade 83 is rigidly mounted to an outboard end portion of grip 113 in a clevis 117. Rectangular notches 119 are formed on opposing inboard ends of grip 113, and each notch 119 is sized for receiving a portion of a lead-lag damper 121. In the embodiment shown, each damper 121 comprises a strap mounting plate 123, an elastomeric material 125, and a grip mounting plate 127. Elastomeric material 125 is sandwiched between and permanently attached to plates 123, 127 for opposing and damping relative motion of plates 123, 127. Strap mounting plate 123 of each damper 121 is rigidly mounted to one of straps 95, 97, and grip mounting plate 127 of each damper 121 is rigidly mounted to one of notches 119 on grip 113. Therefore, lead-lag motion of each blade of assembly 79 is damped by two dampers 121. While show as an elastomeric type, each damper 121 may be of another type, such as a hydraulic, pneumatic, or electric damper, or other appropriate type. Also, dampers 121 may be passive or actively controlled.

A shown in FIG. 6 on the assembled blade, this arrangement provides for motion of the inboard end of grip 113 in the opposite direction of the lead or lag motion of blade 83. When blade 83 moves in in-plane motion in the lead direction, as indicated by arrow 129, grip 113 rotates relative to straps 95, 97 and arm 87 about shaft 103 (which defines lead-lag axis 105), and the inboard end of grip 113 moves in the direction shown by arrow 131. When blade 83 moves in the lag direction, as indicated by arrow 133, grip 113 rotates about shaft 103, and the inboard end of grip 113 moves in the direction shown by arrow 135. These motions of the inboard end of grip 113 relative to straps 95, 97 cause deformation of elastomeric material 125 in both dampers 121 for each affected blade, and this opposes and damps the motion of grips 113 relative to straps 95, 97 and the lead-lag motions of the attached blade 83. It should be noted that dampers 121 are located on opposite sides of the rotation plane of blades 83, which removes dampers 121 from the envelope between adjacent blades 83. As the number of blades per rotor increases, reduced size or number of components located between adjacent blades 83 becomes especially advantageous.

During operation, hub assembly 79 rotates together with mast 81 about mast axis 106 as torque is applied to mast 81 and transferred to yoke 85. The resulting centrifugal force from blades 83 are transferred to grips 113. These loads are then transferred from grip 113 into straps 95, 97 through shaft 103 and bearing 102, and the loads are then transferred from straps 95, 97 into yoke 85 through bearing support 93 and bearing 91. Therefore, arm 87 is not loaded with centrifugal force, which allows more flapping than with a loaded flexure, and hub assembly 79 can be designed to allow for at least approximately 8 degrees of steady-state flapping. Lead-lag motion of blades 83 is allowed about axis 105, and this motion is damped by dampers 121, which are deformed by the relative motion of grips 133 and straps 95, 97.

Figure 8:
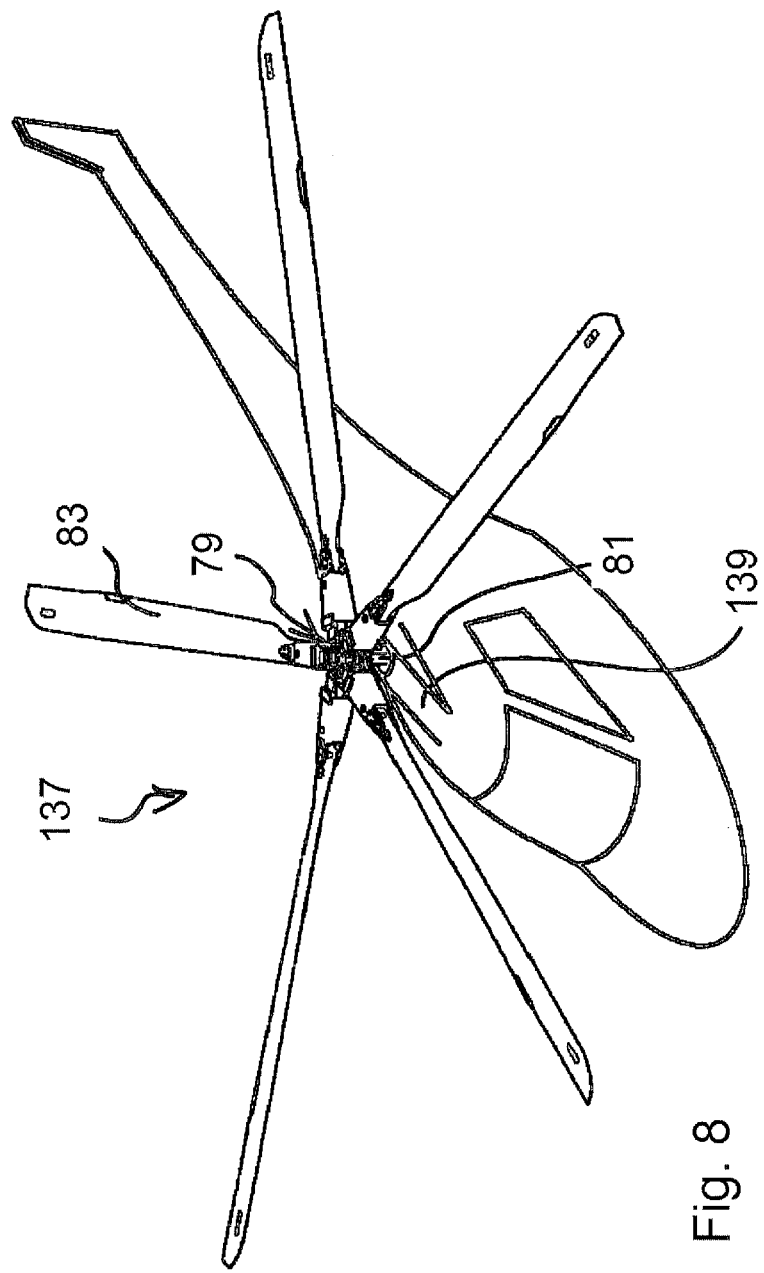
FIG. 8 is an oblique view of an aircraft having the rotor hub assembly of FIG. 5 installed thereon.

FIG. 8 shows an aircraft 137 having a rotor hub assembly 79 assembled thereto. Hub assembly 79 is rigidly mounted to mast 81, and an engine located in area 139 of aircraft 137 provides torque for rotating mast 81 and hub assembly 79 to create lift and thrust forces for flight of aircraft 137. Though shown with five blades 83, rotor hub assembly 79 may accommodate more or fewer blades 83, which will be determined for each specific application.

The rotor hub assembly provides for several advantages, including: (1) an increased lead-lag frequency and (2) elimination of components between adjacent blades.

While the foregoing description refers to an illustrative embodiment, this description is not intended to be construed in a limiting sense. Various modifications and combinations of the illustrative embodiment will be apparent to persons skilled in the art upon reference to the description.

The invention claimed is:

1. A rotor hub for an aircraft, the rotor hub connecting outboard rotor blades to an inboard central mast for rotation with the mast, the blades defining a rotor plane, the rotor hub comprising:
- a yoke having flexure arms extending radially outboard from a central portion of the yoke, each arm allowing for flapping of the associated blade about a flap axis;
- a plurality of blade grips, an outboard end portion of each grip being rigidly attached to one of the blades;
- a lead-lag bearing connecting a central portion of each grip to an outboard end portion of one of the arms, the lead-lag bearing defining a lead-lag axis generally normal to the rotor plane and outboard of the flapping axis;
- a pair of straps for each arm, the straps being located on opposite sides of the rotor plane and adapted to transfer centrifugal force from the blades to the central portion of the yoke, such that each arm is substantially free of centrifugal force from the associated blade; and
- a pair of lead-lag dampers for each grip, the dampers of each being located on opposite sides of the rotor plane and connecting an inboard end portion of the associated grip to the adjacent associated strap;
- wherein in-plane lead or lag motion of one of the blades causes rotation of the attached grip about the associated lead-lag axis and causes motion in an opposite direction of an inboard end portion of the grip, and the associated dampers oppose rotation of the grip and the lead-lag motion of the attached blade.

2. The rotor hub of claim 1, further comprising:
a spherical bearing connecting inboard end portions of each in a pair of straps to the central portion of the yoke.

3. The rotor hub of claim 1, wherein the dampers are elastomeric.

4. The rotor hub of claim 1, wherein the dampers comprise a hydraulic damping system.

5. The rotor hub of claim 1, wherein the dampers comprise a pneumatic damping system.

6. The rotor hub of claim 1, wherein the dampers comprise an electric damping system.

7. The rotor hub of claim 1, wherein the dampers are actively controlled.

8. The rotor hub of claim 1, wherein the lead-lag bearing is elastomeric.

9. A method of damping in-plane motion of blades connected to a rotor hub of an aircraft, the rotor hub connecting outboard rotor blades to an inboard central mast for rotation with the mast, the blades defining a rotor plane, the method comprising:
- (a) providing a yoke having flexure arms extending radially outboard from a central portion of the yoke, each arm allowing for flapping of the associated blade about a flap axis;
- (b) providing a plurality of blade grips, an outboard end portion of each grip being rigidly attached to one of the blades;
- (c) providing a lead-lag bearing connecting a central portion of each grip to an outboard end portion of one of the arms, the lead-lag bearing defining a lead-lag axis generally normal to the rotor plane and outboard of the flapping axis;
- (d) providing a pair of straps for each arm, the straps being located on opposite sides of the rotor plane and adapted to transfer centrifugal force from the blades to the central portion of the yoke, such that each arm is substantially free of centrifugal force from the associated blade;
- (e) providing a pair of lead-lag dampers for each grip, the dampers of each being located on opposite sides of the rotor plane and connecting an inboard end portion of the associated grip to the adjacent associated strap;
- (f) damping in-plane lead or lag motion of each blade by opposing rotation of the attached grip with the associated dampers.

10. An aircraft, comprising a rotor hub connecting outboard rotor blades to an inboard central mast for rotation with the mast, the blades defining a rotor plane, the rotor hub comprising:
- a yoke having flexure arms extending radially outboard from a central portion of the yoke, each arm allowing for flapping of the associated blade about a flap axis;
- a plurality of blade grips, an outboard end portion of each grip being rigidly attached to one of the blades;
- a lead-lag bearing connecting a central portion of each grip to an outboard end portion of one of the arms, the lead-lag bearing defining a lead-lag axis generally normal to the rotor plane and outboard of the flapping axis;
- a pair of straps for each arm, the straps being located on opposite sides of the rotor plane and adapted to transfer centrifugal force from the blades to the central portion of the yoke, such that each arm is substantially free of centrifugal force from the associated blade; and
- a pair of lead-lag dampers for each grip, the dampers of each being located on opposite sides of the rotor plane and connecting an inboard end portion of the associated grip to the adjacent associated strap;
- wherein in-plane lead or lag motion of one of the blades causes rotation of the attached grip about the associated lead-lag axis and causes motion in an opposite direction of an inboard end portion of the grip, and the associated dampers oppose rotation of the grip and the lead-lag motion of the attached blade.

11. The aircraft of claim 10, further comprising:
a spherical bearing connecting inboard end portions of each in a pair of straps to the central portion of the yoke.

12. The aircraft of claim 10, wherein the dampers comprise a hydraulic damping system.

13. The aircraft of claim 10, wherein the dampers comprise a pneumatic damping system.

14. The aircraft of claim 10, wherein the dampers comprise an electric damping system.

15. The aircraft of claim 10, wherein the dampers are actively controlled.

16. The aircraft of claim 10, wherein the lead-lag bearing is elastomeric.

* * * * *